United States Patent
Lubetkin et al.

(10) Patent No.: US 9,159,147 B2
(45) Date of Patent: Oct. 13, 2015

(54) METHOD AND APPARATUS FOR PERSONALIZED HANDWRITING AVATAR

(71) Applicant: AirDrawer LLC, Washington, DC (US)

(72) Inventors: Ian Lubetkin, Washington, DC (US); Stephen Martin, New York, NY (US); Gahl Burt, Washington, DC (US)

(*) Notice: Subject to any disclaimer, the term of this patent is extended or adjusted under 35 U.S.C. 154(b) by 229 days.

(21) Appl. No.: 13/841,250

(22) Filed: Mar. 15, 2013

(65) Prior Publication Data

US 2014/0267302 A1 Sep. 18, 2014

(51) Int. Cl.
  *G06T 11/00* (2006.01)
  *G06T 11/20* (2006.01)
(52) U.S. Cl.
  CPC .................... *G06T 11/203* (2013.01)
(58) Field of Classification Search
  None
  See application file for complete search history.

(56) References Cited

U.S. PATENT DOCUMENTS

| | | | |
|---|---|---|---|
| 8,253,742 B2* | 8/2012 | Stamm et al. | 345/469 |
| 2004/0140977 A1* | 7/2004 | Hakamada | 345/467 |
| 2006/0078203 A1* | 4/2006 | Loeb | 382/187 |
| 2012/0001921 A1* | 1/2012 | Escher et al. | 345/467 |
| 2013/0035946 A1* | 2/2013 | Ratan et al. | 705/2 |
| 2014/0019761 A1* | 1/2014 | Shapiro | 713/176 |

OTHER PUBLICATIONS

Soon-Bum Lim and Myung-Soo Kim, Oriental character font design by a structured composition of stroke elements, 1995, Computer-Aided Design. vol. 27. No. 3. pp. 193-207.*
Elena Jakubiak Hutchinson, An Improved Representation for Stroke-Based Typefaces and a Method for their Creation, May 2009, Tufts University, Computer Science dissertation.*

* cited by examiner

*Primary Examiner* — Mark Zimmerman
*Assistant Examiner* — Phuc Doan

(57) ABSTRACT

A computer-implemented process includes: receiving into a computer memory a response to a generic question not specifically related to handwriting style; converting the response into one or more tags representing handwriting characteristics; selecting a typeface having a handwriting characteristic of one of the tags; receiving a text string to display into a computer memory; and displaying the text string by rendering glyphs from a font file containing glyphs for the selected typeface, after applying random variations to simulate human handwriting variation.

7 Claims, 4 Drawing Sheets

METHOD AND APPARATUS FOR PERSONALIZED HANDWRITING AVATAR

SUMMARY

Numerous forms of personal communication formerly carried out at least in part using a personalized, handwritten letter or note are now carried out via electronic means facilitated by computers, mobile devices, computer networks and the like. Such modern technology has previously been better suited to somewhat more structured, impersonal communication, such as email (less formal) and typewritten correspondence in the form of letters, notes, memos, and the like (more formal). Typed correspondence, even informal email correspondence, is carefully formatted, including such characteristics as layout, graphics, and selection of typefaces. Yet, the personal touch provided by manuscript is still missing.

Personalized notes and other correspondence can be created by scanning a hand written manuscript, or by using specialized input devices, such as digital input pens, to capture a hand written manuscript electronically. Such methods are time-consuming, require specialized hardware beyond the now-ubiquitous keyboard, and are cumbersome for the average consumer to use.

According to aspects of an embodiment, a computer-implemented process comprises: receiving into a computer memory a response to a generic question not specifically related to handwriting style; converting the response into one or more tags representing handwriting characteristics; selecting a typeface having a handwriting characteristic of one of the tags; receiving a text string to display into a computer memory; and displaying the text string by rendering glyphs from a font file containing glyphs for the selected typeface, after applying random variations to simulate human handwriting variation. In a variation, applying random variations comprises: applying weighted randomization to elements comprising the glyphs dependent upon the one or more tags. In a further variation, applying weighted randomization further comprises one or more of: varying points defining boundaries of elements of the glyphs, applying slant to a stroke, applying directionality to a stroke, and varying stroke weight. In a different variation, the process further comprises: creating the font file by defining for each glyph, elements including strokes having direction, a start point, and an end point; and defining for the strokes whether connections between strokes are present. In a further variation, the process comprises: applying weighted randomization to one or more of the strokes, the direction, the start point, and the end point.

According to another aspect of an embodiment, an article of manufacture comprises: a computer storage medium; computer program instructions stored on the computer storage medium which, when processed by a processing device, instruct the processing device to perform a process comprising: receiving into a computer memory a response to a generic question not specifically related to handwriting style; converting the response into one or more tags representing handwriting characteristics; selecting a typeface having a handwriting characteristic of one of the tags; receiving a text string to display into a computer memory; and displaying the text string by rendering glyphs from a font file containing glyphs for the selected typeface, after applying random variations to simulate human handwriting variation.

According to yet another aspect of an embodiment, a computing machine comprises: a software module executing on a processor for: receiving into a computer memory a response to a generic question not specifically related to handwriting style; converting the response into one or more tags representing handwriting characteristics; and selecting a typeface having a handwriting characteristic of one of the tags; a software module executing on a processor for: receiving a text string to display into a computer memory; and displaying the text string by rendering glyphs from a font file containing glyphs for the selected typeface, after applying random variations to simulate human handwriting variation.

In the following description, reference is made to the accompanying drawings, which form a part hereof, and in which are shown example implementations. It should be understood that other implementations are possible, and that these example implementations are intended to be merely illustrative.

DETAILED DESCRIPTION

The following section provides an example of an operating environment in which a method and apparatus for creating and using a personalized handwriting avatar can be implemented.

Figure 4:
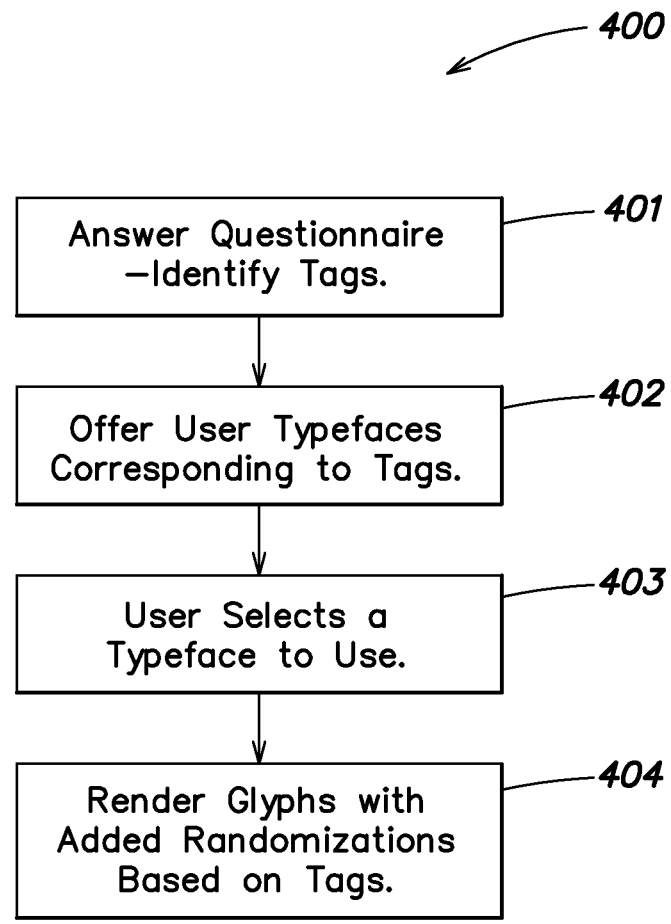
FIG. 4 is a flow diagram illustrating an overview of a process for creating personalized correspondence.

In accordance with aspects of embodiments, illustrated by the flow chart of FIG. 4, electronic correspondence is personalized, 400, with typography based on individualized, personal-appearing handwriting that represents the user's handwriting without necessarily mimicking the user's handwriting. In order to provide such personalization, other aspects of embodiments include preparing and selecting individualized fonts having various combinations of slant, directionality, and stroke weight; and randomizing the appearance of rendered glyphs from a selected font, in order to make the resulting typography appear to have been produced by a human hand. The combination of selection and randomization of the rendering process produces typographic handwriting characteristics related in recognizable ways to characteristics of the user's own handwriting, without being a reproduction of the user's own handwriting.

According to an overview of some aspects, with reference to FIG. 4, a user answers a series of personal questions whose answers act individually or in combination to identify tags indicative of characteristics of handwriting (Step 401). Tags may be associated with characteristics inherent to a typeface design, or may be associated with aspects of randomization that occurs when a human writes by hand. A group of typefaces is offered to the user based on the tags identified (Step 402), from which the user selects a typeface (Step 403) that the user finds to be a pleasing handwriting "avatar" that will be used in place of the user's own handwriting in electronic communication designed to simulate handwritten communication.

The typeface selected is defined in a new type of font file, distinct from other raster- or vector-based font definition files. The new font file type defines the typeface as modified vectors, using characteristics selected to have various, different humanizing variations. Such a typeface may be derived from a conventional font file or may be created as an original work. Aspects related to creating such typefaces and font files are also described below.

Finally, humanizing randomizations are applied to the glyphs of the typeface as they are rendered (Step 404), in order to produce a result that appears to have been made by an unaided human hand.

The process outlined above avoids the collection of letter-form examples from users, while still providing a suitable representation of a user's personality through the selected and applied handwriting avatar. As an alternative, the font file could be created using the same techniques described below with respect to generic fonts from a scan of the user's own handwritten letterforms. The randomizations and variation introduced during rendering can be derived from the answers to the questionnaire, producing a realistic simulation of human output based on the characteristics identified through the questionnaire.

Figure 1:
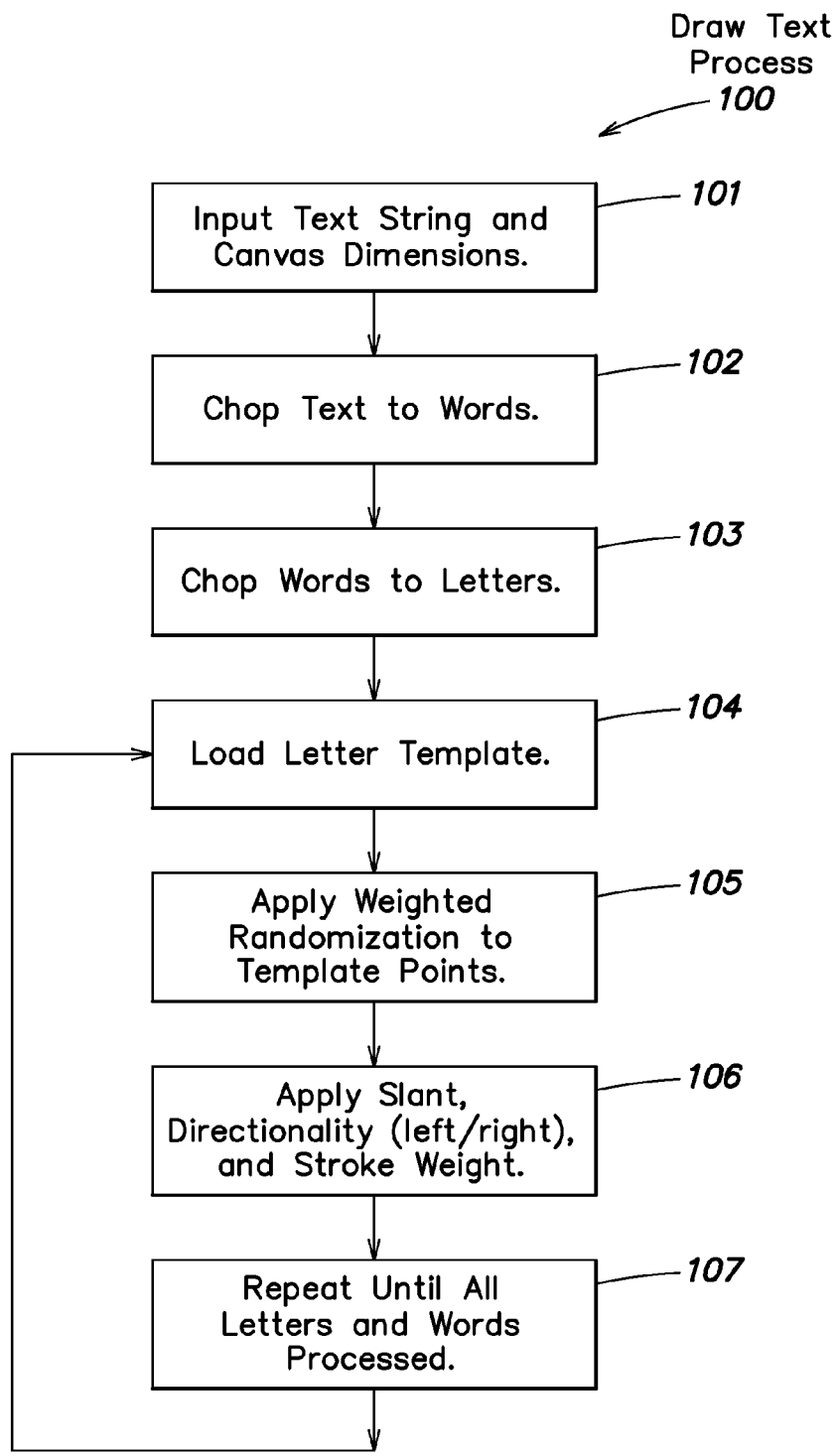
FIG. 1 is a flow diagram illustrating a text drawing process.

Referring to FIG. 1, we now describe the process of creating personalized correspondence from a user's input and a suitable, existing handwriting avatar font file.

Personalization of typography to simulate human handwriting is achieved by both selection of a suitable base typeface, which is defined in a specialized font file, and subsequent randomization of the rendering process whereby individual character glyphs are displayed and/or printed. The rendering, i.e. drawing, process, 100, includes several steps. First, a text string is received into a computer memory, step 101, typically as a result of the user typing the text string into a user interface displayed and controlled by a computer executing any suitable user interface software. For example, a user may type into the user interface the string "Thank you for the referral." The user interface may be displayed using specialized computer hardware and software executed locally to the user, or may be displayed through a network using client-server technologies, pages containing text or text boxes rendered by a web browser, or any other suitable technology. The rendering process, 100, then proceeds to divide the text string into individual words, step 102, e.g., "Thank," "you," etc. The words are then further divided into individual letters, step 103, e.g., "T," "h," "a," etc. Any suitable means of recognizing individual glyphs to be rendered, including glyph variations that may occur at the beginning or end of words may be employed to perform steps 102 and 103; furthermore, steps 102 and 103 may be combined. For example, in handwriting simulations, joining appendages of intermediate glyphs "h," "a," and "n" of the word "Thank" should differ from the joining or lack thereof of the "T" and "k." If the language or handwriting style to be rendered is represented by glyphs requiring different division of the input string, then steps 102 and 103 may be altered to provide the required division of the input string.

Continuing with the example of a language in which glyphs represent letters, each of the letters is now processed. A letter template defining the glyph for the letter is loaded from the font file, step 104. Weighted randomization values are combined with the position information defined for points in the template, step 105. The weights are derived from personal information collected from the user and used to personalize the typography to correspond to characteristics representing the user as described further below. Such positional variations help produce a handwritten appearance in rendered text. Finally, slant, directionality, and stroke weight information are applied to the strokes rendered, step 106. The slant, directionality and stroke weight are similarly derived from personal information collected from the user and used to personalize the typography to correspond to characteristics representing the user as described further below. This further simulates a handwritten appearance in the rendered glyph. The process steps 104, 105, and 106 can be repeated, indicated in FIG. 1 by conditional path 107, until all the letters and words, or other individual glyphs representing the text string received into memory have been processed.

Where specific randomization and personalization information have been referenced in connection with steps 105 and 106, any other suitable customization and randomization desired that produce typography having more human-like, handwritten characteristics may be employed. In step 104, where a letter template is loaded, the font file may include glyphs representing the form of a letter when used as an initial or final letter of a word that are different from that representing the form of a letter when used as an intermediate letter of a word. Rendering the letter according to its usage within the text string becomes part of the humanization of the typography to represent the way in which an actual manuscript would tend to appear. While following the steps of processes according to aspects of embodiments, any suitable rendering processes, systems, or software that can be adapted to the steps of processes according to such aspects may be used. According to one example of an embodiment, the ImageMagick open source renderer (Version 6.8.3-5) may be programmed, modified, and/or otherwise used to perform rendering as described.

Figure 2:
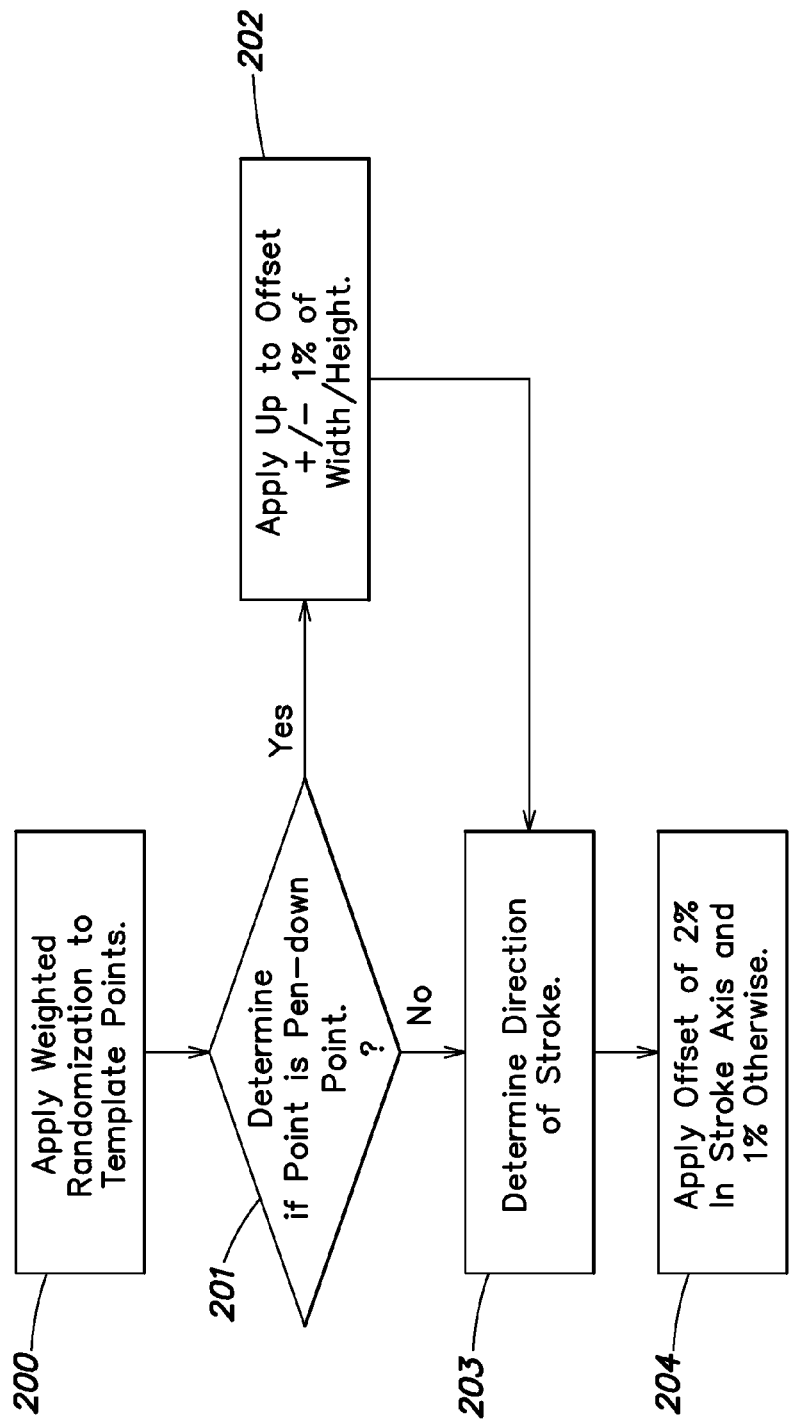
FIG. 2 is a flow diagram illustrating a process for applying randomization to typography.

In somewhat more detail, the addition of variation during rendering is described in connection with FIG. 2. Overall, the process is one of applying weighted randomizations to the template points and directions defined in the new font file, 200.

First, a point to be processed is identified, and a determination is made whether the point is a pen-down point, step 201; that is, the point is identified as the location where a series of one or more strokes begins or ends, each stroke being defined by its beginning and ending points. Between the pen-down point and the pen-up point, each stroke proceeds in a defined direction from a starting point to an ending point, the starting point of a succeeding stroke in such a chain coinciding with the ending point of a preceding stroke in the chain. If the point is a pen-down point, a random offset of up to a desired percentage of the width and/or height of the stroke, e.g., up to ±1% of the width/height of the stroke, depending on the tags associated with the user, is applied, step 202. The variation applied may be different in other embodiments. After applying the pen-down variation, step 202, or immediately after determining the point is not a pen-down point, step 201, the direction of the stroke is determined, step 203. A weighted random offset of up to a desired percentage in the axis of the stroke direction, and another weighted offset of up to a desired percentage off the axis of the stroke direction, are combined and applied to the direction of the rendered stroke, step 204. For example, up to ±2% variation in direction along the stroke axis and up to ±1% variation in direction off the stroke axis are combined and applied to the stroke direction rendered. The variations applied may be different in other embodiments. According to some embodiments, the variation applied to the pen-down point, step 202, is the greatest variation applied. The entire process, 200, repeats until all the points and strokes of a glyph template have been rendered. The result of this rendering process may be displayed on a screen, output to a printer, loaded into an email message as an image file, or saved in a file for display, printing, or other use as desired.

Next, we describe the process for selecting a typeface to represent the user's own handwriting. The typeface selected will likely not be identical to the user's own handwriting, but as mentioned previously is instead an avatar for the user's own handwriting that symbolically represents aspects of the user's personality, behavior, and/or handwriting characteristics. Even if, as optionally possible, a scan of the user's own handwritten letterforms is the basis for the font selected, the execution of this process permits variation that enhances the handwritten appearance of the rendered font. In order to accommodate a wide range of users having a wide range of handwriting styles, a large number of font choices should be available from which to select; however, presenting a user with a large enough number of fonts to be useful to the range of users would pose a significant problem to the user hoping to efficiently pick a suitable handwriting avatar. Preferably, the number of fonts should be at least 50; providing a choice of over 150 fonts would be more preferable; and providing a choice of over 250 fonts, perhaps even a choice of over 1,000 fonts, would be yet more preferable.

In order to make the selection process manageable for users, a questionnaire is presented that may be composed of questions that may on their face be related to handwriting, but also may be composed of questions that are not on their face related to handwriting; of course, the questionnaire may alternatively be composed of some combination of the two types of questions. Preferably, the questions are not open-ended, but rather, have a defined, limited number of possible answers; more preferably, the questions should be presented in multiple-choice style. The choices selected in response to each question, or possibly certain combinations of questions, are linked through a table of possible answers to identifiers, referred to hereinafter as "tags," of different handwriting characteristics known to be statistically or otherwise linked to the possible answers or combinations of answers.

A question specifically related to handwriting might be a question such as, "Does your handwriting slant heavily to the left, slightly to the left, not at all, slightly to the right, or heavily to the right?" The answer to such a question, after referring to the table, may produce one from a list of very specific tags clearly related to the answer to the question, such as "HeavyLeft," "LightLeft," "NoSlant," "LightRight," or "HeavyRight." Numerous other questions and tags are possible. A question not specifically related to handwriting might be a question such as, "On what continent did you learn cursive writing?" The answer to such a question may, after referring to the table, produce one or more tags generally related to handwriting from certain sources, such as "SerifedOne," "SlashZero," "SlashSeven," and "SlashZed." Another question not specifically related to handwriting might be, "Do you walk up a moving escalator, or walk along a moving sidewalk?" Individuals who answer such a question "yes" may be indicating that they are more "Type-A" people, who as a group are thought to tend to have more angular handwriting. A tag for angularity might then be indicated. Numerous other questions, related characteristics, and corresponding tags are known and possible, based on the study of handwriting characterization or classification, relating handwriting characteristics to culturally and individually taught, and learned, handwriting traits. Graphology, a pseudo-scientific study of the relationship between handwriting characteristics and personality traits may prove useful in connecting the responses to certain types of questions to tags, where the connection is either supported statistically, or has been found to be pleasing to a wide range of users.

A questionnaire having as few as 5, 10, 15, or 20 questions can produce a useful range of combinations of tags for large numbers of users. A questionnaire with as few as 15 yes-no (binary) questions can produce 32,768 unique results. Using 50 tags to represent the presence or absence of various handwriting characteristics can represent over $10^{15}$ different handwritings or fonts—far more than the number of possible unique questionnaire results based on 15 questions, even if some questions have multiple answers rather than binary answers. As few as 50 fonts would provide a system with sufficiently pleasing variation for many purposes; 250 fonts would be a very suitable number of fonts; and, over 1,000 fonts would produce a highly varied, highly personalized result.

The collection of tags produced as a result of any user's responses to the questionnaire is then compared to tags assigned to the typefaces contained in the collection of typefaces from which the system will produce a typographical output. Statistical techniques, fuzzy logic, heuristic methods, or other matching methods are then applied to identify a limited number of typefaces, for example 3-5 or some other small number, to present to the user, from which a final choice of handwriting avatar is made. By narrowing down the choices in this way, the user is likely to arrive at a more pleasing handwriting avatar more quickly than had the user selected a single typeface from the large number potentially available, e.g., over 1,000, in the complete collection using a conventional browsing process.

The creation of the typefaces and font files used in the aspect of the invention described above is now described in connection with FIG. 3.

The font file defining a typeface consists of a collection of definitions of individual typographical symbols, called glyphs. Each glyph, for example, may represent one of several ways to render a particular letter, depending on the usage of the letter. There are many known ways to define the glyphs in a font file, including point/vector representations of the strokes of a glyph, Bezier (or other) curves defining the strokes of a glyph, and raster definitions of each glyph pixel-by-pixel at one or more defined resolutions.

Figure 3:
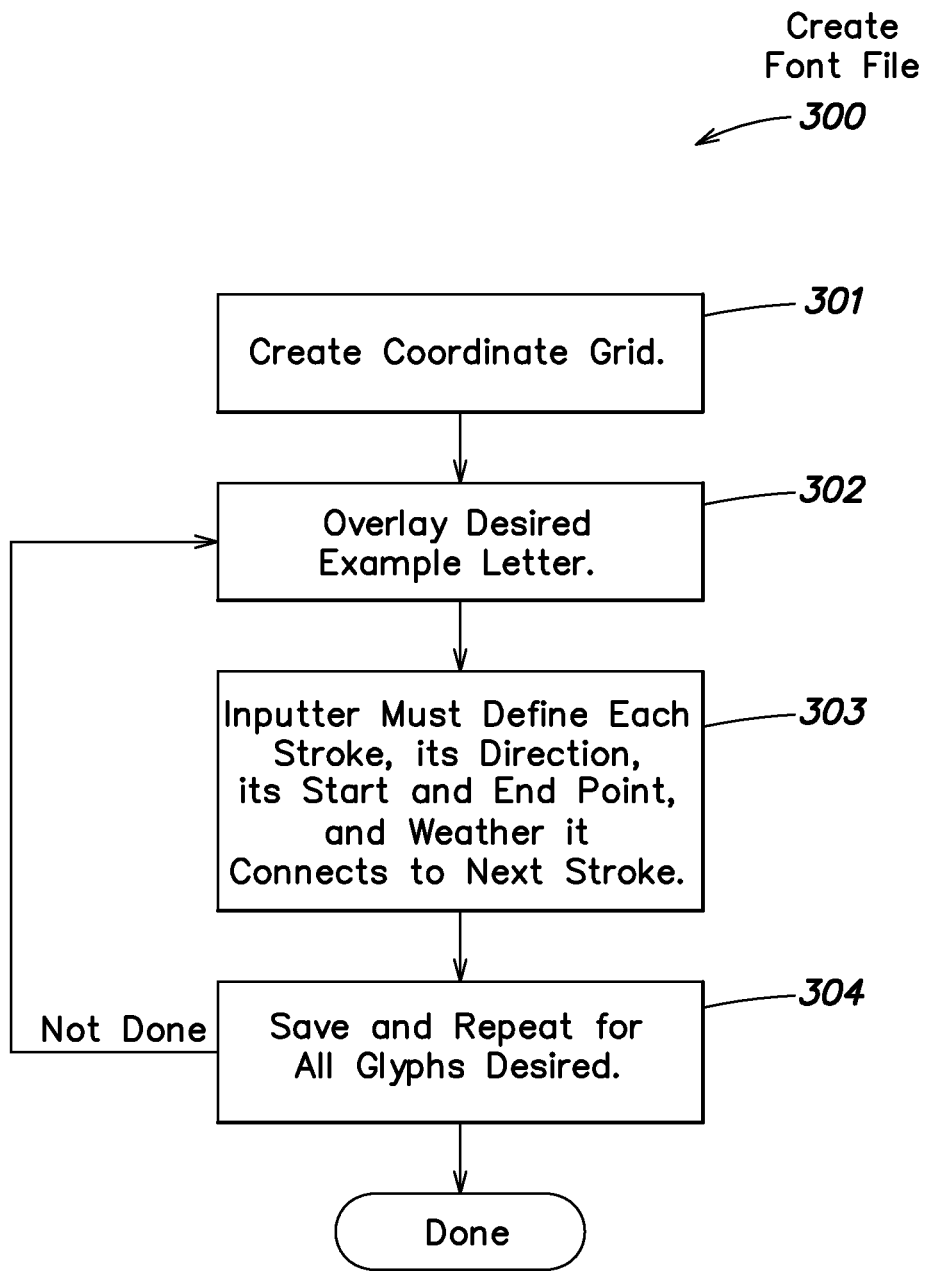
FIG. 3 is a flow diagram illustrating a process for creating a font file.

In accordance with some aspects, FIG. 3 illustrates the process for creating a specialized font file, 300. The font file to be created is defined by a collection of data structures, as follows:

Name:string—name of handwriting font
Scale:float—scale of coordinates
Glyph:char—glyph represented
Strokes:Array of Strokes—list of all strokes In the foregoing data structures, a "string" is a sequence of numbers in a computer memory or storage medium representing a text string, a "float" is a floating point number in a computer memory or storage medium having an integer part and a decimal part, a "char" is a number in a computer memory or storage medium representing an individual character, and an array is, in a computer memory or storage medium, an organized list of elements which may be, for example, data structures or pointers to data structures.

Each stroke in the array of strokes is represented by the data structure:

ArrayOfCoords: Array of the following->
X:int—x coord of point
Y:int—y coord of point
DownStroke?:bool In the array of strokes, an "int" is a number in a computer memory or storage medium representing an integer, and "bool" is a number in a computer memory or storage medium representing a Boolean value, i.e., a "True" or "False" value. The process, 300, loads up plural data structures as defined above, or similar data structures as desired for particular embodiments, as follows. The process, 300, may be performed manually by a skilled operator, automatically by a computer-implemented process, or by a combination of acts performed by a skilled operator and acts performed automatically by a computer-implemented process.

A grid is first defined, step 301, which will assist an operator in creating certain typeface information. The grid is then overlaid on an image of a glyph to be incorporated in the font file, step 302. The glyph may be loaded from an existing conventional font file or a scan of a user's own handwritten letterforms, for example. Using the grid to define locations, an operator or an automated process defines each stroke, its direction, its start and end point, and whether it connects to next stroke, step 303. Defining the strokes, directions, start and end points, and connections, step 303, adds information to the new font file that does not exist in conventional font files. The entire process is repeated for all glyphs desired to be included in the font file, step 304. An operator can accomplish this by using an interface including display of an image and mouse-based input gestures. Desired glyphs can include different versions of each letter of an alphabet that may be used under different circumstances, so as to create a handwritten effect. Non-alphabetic glyphs and complete alphabets can also be created and adapted using this process.

Each of the processes and/or methods described and/or exemplified above can be embodied in sequences of computer software executing on general purpose or specific purpose computer processing equipment. The partitioning of specific acts and/or steps into particular modules or clustered functionality can result in a wide range of embodiments of aspects. For example, the rendering method may be embodied in a software system executing on a single system or cluster of systems connected to a computer network so as to provide software as a service or cloud service. Alternatively, the rendering method may be embodied in a software system divided into a client system executing on a computer system local to the user, which communicates with additional components of the rendering method executing on a server system or cluster of server systems connected to a computer network for access, by a plurality of such client systems. Font file creation processes can be embodied in software executing on a computer system local to the font creation operator, or can be embodied in software executing on a single computer system or cluster of computer systems connected to a computer network so as to provide software as a service or cloud service. Client-server configurations of font file creation processes can also be arranged. Numerous other variations will be suggested by the examples given, and are contemplated as variations of embodiments and aspects.

As mentioned previously, conversion of existing, conventional font files to the specialized font file format described is not required. For example, a scan of a user's handwritten letterforms and other glyphs could alternatively be converted to the specialized font file format by the methods and/or processes described.

What is claimed is:

1. A computer-implemented process for displaying text in simulated human handwriting representing the handwriting of an author, comprising:
   receiving into a computer memory a response to a personal question about the author not specifically related to handwriting;
   associating each one of a set of valid responses to the personal question with a handwriting characteristic or a random variation to simulate human handwriting variation;
   converting the response, after receiving and associating, into one or more tags, each tag representing the handwriting characteristic or the random variation to simulate human handwriting variation associated with the response;
   selecting a typeface having a handwriting characteristic of one of the tags;
   receiving a text string to display into a computer memory; and
   displaying the text string by rendering glyphs from a font file containing glyphs for the selected typeface, after applying the random variation to simulate human handwriting variation of one of the tags.

2. The computer-implemented process of claim 1, wherein applying random variations comprises:
   applying weighted randomization to elements comprising the glyphs dependent upon the one or more tags.

3. The computer-implemented process of claim 2, wherein applying weighted randomization further comprises one or more of:
   varying points defining boundaries of elements of the glyphs, applying slant to a stroke, applying directionality to a stroke, and varying stroke weight.

4. The computer-implemented process of claim 1, further comprising:
   creating the font file by:
   defining for each glyph, elements including strokes having direction, a start point, and an end point; and
   defining for the strokes whether connections between strokes are present.

5. The computer-implemented process of claim 4, further comprising:
   applying weighted randomization to one or more of the strokes, the direction, the start point, and the end point.

6. An article of manufacture comprising:
   a tangible computer storage medium holding non-transitory marks representing computer program instructions;
   the computer program instructions stored on the tangible computer storage medium which, when processed by a processing device, instruct the processing device to perform a process comprising:
   receiving into a computer memory a response to a personal question about an author not specifically related to handwriting;
   associating each one of a set of valid responses to the personal question with a handwriting characteristic or a random variation to simulate human handwriting variation;
   converting the response, after receiving and associating, into one or more tags, each tag representing the handwriting characteristic or the random variation to simulate human handwriting variation associated with the response;
   selecting a typeface having a handwriting characteristic of one of the tags;
   receiving a text string to display into a computer memory; and
   displaying the text string by rendering glyphs from a font file containing glyphs for the selected typeface, after applying the random variation to simulate human handwriting variation of one of the tags.

7. A machine comprising:
   a computer processor constructed and arranged to execute software;
   a computer memory constructed and arranged to hold software and data and connected to communicate the software and data into and out of the computer processor; and
   an output device constructed and arranged to render images;
   a software module executing on the processor for:
   receiving into the computer memory memory a response to a personal question about an author not specifically related to handwriting;

associating each one of a set of valid responses to the personal question with a handwriting characteristic or a random variation to simulate human handwriting variation;

converting the response, after receiving and associating, into one or more tags, each tag representing the handwriting characteristic or the random variation to simulate human handwriting variation associated with the response; and selecting a typeface having a handwriting characteristic of one of the tags; and a software module executing on the processor for:

receiving a text string to display into a computer memory; and displaying on the output device the text string by rendering glyphs from a font file containing glyphs for the selected typeface, after applying the random variation to simulate human handwriting variation of one of the tags.

\* \* \* \* \*